(12) United States Patent
Aghili et al.

(10) Patent No.: US 8,995,422 B2
(45) Date of Patent: Mar. 31, 2015

(54) SIGNALING IN A WIRELESS COMMUNICATION SYSTEM

(75) Inventors: Behrouz Aghili, Melville, NY (US); Stephen G. Dick, Nesconset, NY (US); Prabhakar R. Chitrapu, Blue Bell, PA (US); Marian Rudolf, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1160 days.

(21) Appl. No.: 12/142,920

(22) Filed: Jun. 20, 2008

(65) Prior Publication Data

US 2009/0022137 A1 Jan. 22, 2009

Related U.S. Application Data

(60) Provisional application No. 60/945,537, filed on Jun. 21, 2007, provisional application No. 60/968,186, filed on Aug. 27, 2007.

(51) Int. Cl.
| | |
|---|---|
| *H04B 7/212* | (2006.01) |
| *H04L 1/00* | (2006.01) |
| *H04L 1/18* | (2006.01) |
| *H04L 1/16* | (2006.01) |

(52) U.S. Cl.
CPC ............ *H04L 1/0041* (2013.01); *H04L 1/0025* (2013.01); *H04L 1/0061* (2013.01); *H04L 1/0072* (2013.01); *H04L 1/008* (2013.01); *H04L 1/009* (2013.01); *H04L 1/1896* (2013.01); *H04L 1/0003* (2013.01); *H04L 1/0028* (2013.01); *H04L 1/0075* (2013.01); *H04L 1/1671* (2013.01); *H04L 1/1867* (2013.01)

USPC .......................................... 370/349; 370/474

(58) Field of Classification Search
USPC .................................................. 370/471, 474
See application file for complete search history.

(56) References Cited

U.S. PATENT DOCUMENTS

| | | | |
|---|---|---|---|
| 6,766,493 B1* | 7/2004 | Hoffman et al. | 714/785 |
| 6,931,581 B1* | 8/2005 | Cassiday et al. | 714/758 |
| 7,434,150 B1* | 10/2008 | Barash | 714/807 |
| 2005/0063347 A1* | 3/2005 | Sarkkinen et al. | 370/338 |
| 2005/0107036 A1* | 5/2005 | Song et al. | 455/23 |
| 2007/0133397 A1* | 6/2007 | Bianchi et al. | 370/225 |
| 2007/0258413 A1* | 11/2007 | Sebire | 370/337 |

(Continued)

FOREIGN PATENT DOCUMENTS

| | | |
|---|---|---|
| EP | 1 093 264 | 4/2001 |
| EP | 1 337 065 | 8/2003 |
| WO | 2005/125050 | 12/2005 |

OTHER PUBLICATIONS

"Fallback to GERAN-CS in 3GPP TS 23.401", 3GPP TSG-GERAN Meeting #34bis, G2-070184, (Povoa de Varzim, Portugal, Jun. 25-29, 2007).

(Continued)

*Primary Examiner* — Jackie Zuniga Abad
(74) *Attorney, Agent, or Firm* — Volpe and Koenig, P.C.

(57) ABSTRACT

A method of operating a wireless transmit receive unit (WTRU) and a WTRU configured to receive a radio link control (RLC)/a medium access control (MAC) header. The header is coded for reduced transmission time interval (RTTI) operation. The header includes a 16-bit cyclic redundancy check (CRC) of an RLC/MAC payload associated with the RLC/MAC header.

20 Claims, 5 Drawing Sheets

(56) References Cited

U.S. PATENT DOCUMENTS

2010/0011273 A1* 1/2010 Parolari .................. 714/749
2010/0110946 A1* 5/2010 Diachina et al. ............ 370/310

OTHER PUBLICATIONS

Ericsson, "Additional Description of GPSTOW", Change Request, 44.031 CR 0169, Current Version 7.5.0, 3GPP TSG-GERAN2 Meeting #34bis, GP-070185, (Povoa de Varzim, Portugal, Jun. 25-29, 2007).

Ericsson, "Correction to Ganss Navigation Model", Change Request, 44.031 CR 0170, Current Version, 7.5.0, 3GPP TSG-GERAN2 Meeting #34bis, GP-070186, (Povoa de Varzim, Portugal, Jun. 25-29, 2007).

Ericsson, "Downlink Signalling in RTTI Mode", 3GPP TSG GERAN #34, GP-070715, (Shenzhen, China, May 14-18, 2007).

Ericsson, "Downlink Signalling in RTTI Mode", 3GPP TSG GERAN2#34bis, G2-070173, (Povoa de Varzim, Portugal, Jun. 25-29, 2007).

Ericsson, "Implicit TFI Adressing in PAN", Change Request, 44.060 CR 0922, Current Version 7.9.0, 3GPP TSG-GERAN2 Meeting #34-bis, G2-070172, (Povoa de Varzim, Portugal, Jun. 25-29, 2007).

Ericsson, "Introduction of Implicit TFI Addressing in PAN Field", 3GPP TSG GERAN2#34bis, G2-070171, (Povoa de Varzim, Portugal, Jun. 25-29, 2007).

Ericsson, "MCS-1 Signalling for RTTI RLC/MAC Control Blocks in Multiplexing Case", Change Request, 44.060 CR 0923, Current Version 7.9.0, 3GPP TSG-GERAN2 Meeting #34-bis, G2-070174, (Povoa de Varzim, Portugal, Jun. 25-29, 2007).

Ericsson, "Support for Inter-Domain Handover", Change Request, 44.060 CR 0929, Current Version 7.8.0, 3GPP TSG-GERAN2 Meeting #34-bis, G2-070183, (Povoa de Varzim, Portugal, Jun. 25-29, 2007).

Ericsson, "Transmission of PAN in Case of No Data in Transmit Buffer", Change Request, 44.064 CR 0925, Current Version 7.1.0, 3GPP TSG-GERAN2 Meeting #34-bis, G2-070176, (Povoa de Varzim, Portugal, Jun. 25-29, 2007.

Ericsson, "Transmission of PAN in Case of No Data in Transmit Buffer", Change Request, 44.060 CR 0924, Current Version 7.9.0, 3GPP TSG-GERAN2 Meeting #34-bis, G2-070175, (Povoa de Varzim, Portugal, Jun. 25-29, 2007).

Ericsson, "USF Granularity "One" Support for EDA in Reduced TTI Configuration", Change Request, 44.060 CR 0928, Current Version 7.9.0, 3GPP TSG-GERAN2 Meeting #34-bis, G2-070180, (Povoa de Varzim, Portugal, Jun. 25-29, 2007).

Ericsson, "USF Granularity One Support for Dynamic Allocation in Reduced TTI Configuration", Change Request, 44.060 CR 0927, Current Version 7.9.0, 3GPP TSG-GERAN2 Meeting #34-bis, G2-070179, (Povoa de Varzim, Portugal, Jun. 25-29, 2007).

Ericsson, "Downlink Signalling in RTTI Mode," 3GPP TSG GERAN #34, Tdoc GP-070715 (May 14-18, 2007).

Nokia Siemens Networks et al., "Proposals for RTTI RLC/MAC Control Messages", 3GPP TSG GERAN #35, GP-071282, (Dublin, Ireland, Aug. 27-31, 2007).

Telefon AB LM Ericsson, "Channel Coding for MCS-0", Change Request, 45.003 CR 0085, Current Version 7.2.0, 3GPP TSG-GERAN2 Meeting #34-bis, GP-071955, (Vancouver, Canada, Nov. 12-16, 2007).

Telefon AB LM Ericsson, "Design and Evaluation of MCS-0", 3GPP TSG GERAN #36, GP-071724, (Vancouver, Canada, Nov. 12-16, 2007).

Telefon AB LM Ericsson, "Introduction of MCS-0", Change Request, 44.060 CR 0970, Rev, 2, Current Version 7.10.0, 3GPP TSG-GERAN2 Meeting #34-bis, GP-071984, (Vancouver, Canada, Nov. 12-16, 2007).

Third Generation Partnership Project, "Technical Specification Group GSM/EDGE Radio Access Network; Channel coding (Release 7)", 3GPP TS 45.003, V7.1.0, (Feb. 2008).

Third Generation Partnership Project, "Technical Specification Group GSM/EDGE Radio Access Network; Channel coding (Release 7)", 3GPP TS 45.003, V7.5.0, (May 2008).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060, V7.9.0, (May 2007).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060, V7.13.0, (May 2007).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8)," 3GPP TS 44.060, V8.1.0, (May 2008).

Third Generation Partnership Project, "Technical Specification Group GSM/EDGE Radio Access Network; General Packet Radio Service (GPRS); Overall description of the GPRS radio interface; Stage 2 (Release 7)," 3GPP TS 43.064, V7.5.0, (May 2007).

Third Generation Partnership Project, "Technical Specification Group GSM/EDGE Radio Access Network; General Packet Radio Service (GPRS); Overall description of the GPRS radio interface; Stage 2 (Release 7)," 3GPP TS 43.064, V7.9.0, (May 2008).

Ericsson, "Correction to GANSS Navigation Model", Change Request, 44.031 CR 0170, Current Version, 7.5.0 3GPP TSG-GERAN2 Meeting #34bis, GP-070186, (Povoa de Varzim, Portugal, Jun. 25-29, 2007).

Ericsson, "Support for Inter-Domain Handover", Change Request, 44.060 CR 0929, Current Version 7.8.0, 3GPP TSG-GERAN Meeting #34-bis, G2-070183, (Povoa de Varzim, Portugal, Jun. 25-29, 2007).

Ericsson, "Transmission of PAN in Case of No Data in Transmit Buffer", Change Request, 44.064 CR 0925, Current Version 7.1.0, 3GPP TSG-GERAN2 Meeting #34-bis, G2-070176, (Povoa de Varzim, Portugal, Jun. 25-29, 2007).

Ericsson, "USF Granularity "One" Support for EDA in Reduced TTI Configuration", Change Request, 44.060 CR 0928, Current Version 7.9.0, 3GPP TSG-GERAN2 Meeting #34-bis, G2-070184, (Povoa de Varzim, Portugal, Jun. 25-29, 2007).

Telefon AB LM Ericsson, "Channel Coding for MCS-0", Change Request, 45.003 CR 0085, Current Version 7.2.0, 3GPP TSG-GERAN Meeting #36, GP-071955, (Vancouver, Canada, Nov. 12-16, 2007).

Telefon AB LM Ericsson, "Design and Evaluation of MCS-0", 3GPP TSG-GERAN #36, GP-071724, (Vancouver, Canada, Nov. 12-16, 2007).

Telefon AB LM Ericsson, "Introduction of MCS-0", Change Request, 44.060 CR 0970, Rev. 2, Current Version 7.10.0, 3GPP TSG-GERAN Meeting #36, GP-071984, (Vancouver, Canada, Nov. 12-16, 2007).

Third Generation Partnership Project, "Technical Specification Group GSM/EDGE Radio Access Network; General Packet Radio Service (GPRS); Overall description of the GPRS radio interface; Stage 2 (Release 7)," 3GPP TS 45.064, V7.5.0, (May 2007).

Third Generation Partnership Project, "Technical Specification Group GSM/EDGE Radio Access Network; General Packet Radio Service (GPRS); Overall description of the GPRS radio interface; Stage 2 (Release 7)," 3GPP TS 45.064, V7.9.0, (May 2008).

Huawei, "Coding Scheme Update of RTTI," 3GPP TSG GERAN #33, TDoc GP-070169 (Feb. 12-16, 2007).

Third Generation Partnership Project, "Technical Specification Group GERAN; Digital cellular telecommunications system (Phase 2+); General Packet Radio Service (GPRS); Overall description of the GPRS radio interface; Stage 2 (Release 4)," 3GPP TS 43.064 V4.5.0 (Apr. 2004).

Third Generation Partnership Project, "Technical Specification Group GERAN; Digital cellular telecommunications system (Phase 2+); General Packet Radio Service (GPRS); Overall description of the GPRS radio interface; Stage 2 (Release 5)," 3GPP TS 43.064 V5.3.0 (Apr. 2004).

(56) References Cited

OTHER PUBLICATIONS

Third Generation Partnership Project, "Technical Specification Group GSM/EDGE Radio Access Network; General Packet Radio Service (GPRS); Overall description of the GPRS radio interface; Stage 2 (Release 6)," 3GPP TS 43.064 V6.11.0 (Jun. 2006).

Third Generation Partnership Project; "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.23.0 (Nov. 2005).

Third Generation Partnership Project; "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.19.0 (May 2006).

Third Generation Partnership Project; "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.20.0 (Mar. 2008).

Third Generation Partnership Project; "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.22.0 (Jun. 2007).

Third Generation Partnership Project; "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.24.0 (May 2008).

Third Generation Partnership Project; "Technical Specification Group GSM/EDGE Radio Access Network; Location Services (LCS); Mobile Station (MS)—Serving Mobile Location Centre (SMLC) Radio Resource LCS Protocol (RRLP) (Release 4)," 3GPP TS 44.031 V4.14.0 (Jun. 2007).

Third Generation Partnership Project; "Technical Specification Group GSM/EDGE Radio Access Network; Location Services (LCS); Mobile Station (MS)—Serving Mobile Location Centre (SMLC) Radio Resource LCS Protocol (RRLP) (Release 5)," 3GPP TS 44.031 V5.14.0 (Jun. 2007).

Third Generation Partnership Project; "Technical Specification Group GSM/EDGE Radio Access Network; Location Services (LCS); Mobile Station (MS)—Serving Mobile Location Centre (SMLC) Radio Resource LCS Protocol (RRLP) (Release 6)," 3GPP TS 44.031 V6.9.0 (Jun. 2007).

Third Generation Partnership Project; "Technical Specification Group GSM/EDGE Radio Access Network; Location Services (LCS); Mobile Station (MS)—Serving Mobile Location Centre (SMLC) Radio Resource LCS Protocol (RRLP) (Release 7)," 3GPP TS 44.031 V7.5.0 (Jun. 2007).

Third Generation Partnership Project; "Technical Specification Group GSM/EDGE Radio Access Network; Location Services (LCS); Mobile Station (MS)—Serving Mobile Location Centre (SMLC) Radio Resource LCS Protocol (RRLP) (Release 7)," 3GPP TS 44.031 V7.9.0 (May 2008).

Third Generation Partnership Project; "Technical Specification Group GSM/EDGE Radio Access Network; Channel coding (Release 4)," 3GPP TS 45.003 V4.4.0 (Jan. 2005).

Third Generation Partnership Project; "Technical Specification Group GSM/EDGE Radio Access Network; Channel coding (Release 5)," 3GPP TS 45.003 V5.14.0 (Jan. 2006).

Third Generation Partnership Project; "Technical Specification Group GSM/EDGE Radio Access Network; Channel coding (Release 6)," 3GPP TS 45.003 V6.9.0 (Jan. 2006).

Third Generation Partnership Project; "Technical Specification Group Core Network; Mobile Station—Serving GPRS Support Node (MS-SGSN); Logical Link Control (LLC) layer specification; (Release 4)," 3GPP TS 44.064 V.4.3.0 (Mar. 2002).

Third Generation Partnership Project; "Technical Specification Group Core Network; Mobile Station—Serving GPRS Support Node (MS-SGSN); Logical Link Control (LLC) layer specification; (Release 5)," 3GPP TS 44.064 V5.1.0 (Mar. 2002).

Third Generation Partnership Project; "Technical Specification Group Core Network; Mobile Station—Serving GPRS Support Node (MS-SGSN); Logical Link Control (LLC) layer specification; (Release 6)," 3GPP TS 44.064 V6.2.0 (Mar. 2007).

Third Generation Partnership Project; "Technical Specification Group Core Network; Mobile Station—Serving GPRS Support Node (MS-SGSN); Logical Link Control (LLC) layer specification; (Release 7)," 3GPP TS 44.064 V7.1.0 (Mar. 2007).

Third Generation Partnership Project; "Technical Specification Group Core Network; Mobile Station—Serving GPRS Support Node (MS-SGSN); Logical Link Control (LLC) layer specification; (Release 7)," 3GPP TS 44.064 V7.3.0 (Mar. 2008).

\* cited by examiner

SIGNALING IN A WIRELESS COMMUNICATION SYSTEM

CROSS REFERENCE TO RELATED APPLICATIONS

This application claims the benefit of U.S. provisional applications Nos. 60/945,537, filed Jun. 21, 2007, and 60/968,186, filed Aug. 27, 2007 which are incorporated by reference as if fully set forth.

FIELD OF INVENTION

The present invention is related to wireless communication systems.

A goal of the Third Generation Partnership Project (3GPP) Evolution program is to develop new technology, new architecture and new methods for settings and configurations in wireless communication systems in order to improve spectral efficiency, reduce latency and better utilize the radio resource to bring faster user experiences and richer applications and services to users with lower costs.

Release 7 (R7) of the 3GPP global system for mobile communications (GSM) introduces several features that may improve upon throughput and reduce latency of transmissions in the uplink (UL) and downlink (DL). One approach is the Fast Acknowledge/Negative-Acknowledge (ACK/NACK) Reporting (FANR) feature. A second approach is a Reduced Transmission Time Interval (RTTI) feature. A WTRU can operate in both FANR and RTTI modes of operation with legacy enhanced global packet radio system (EGPRS) modulation-and-coding schemes (MCSs) and with the newer EGPRS-2 modulation and coding schemes, such as EGPRS-2 DL reduced symbol duration higher order modulation and turbo coding (REDHOT) or EGPRS-2 UL, or, or higher uplink performance for GERAN evolution (HUGE) features. FANR or RTTI operation can also be combined with GSM R7 Downlink Dual-Carrier mode of operation (DARP Phase I or II) as well as future modes of GSM operation in which the Temporary Block Flow (TBF) of a WTRU packet connection is set up to operate using FANR or RTTI transmission or reception.

Prior to GSM R7, legacy EGPRS permitted transmission only in a basic transmission time interval (BTTI) format. BTTI transmission requires the transmission of four (4) bursts per radio block. Each burst is sent on the same assigned timeslot per frame over four (4) consecutive frames. For example, if a WTRU is assigned timeslot (TS) 3, it may receive an entire radio block by extracting a first burst from TS 3 in GSM frame (N), a second burst from TS 3 in GSM frame (N+1), third burst from TS 3 in GSM frame (N+2), and a forth burst from TS 3 in GSM frame (N+4), where N is an integer value. As each frame has duration of 4.615 msec, pursuant to the GSM standard, the transmission of an entire radio block takes four (4) frames times 4.615 msecs, or approximately 20 msecs. It is also possible that a WTRU is assigned more than one (1) TS for reception of data by using multislot transmission and/or reception capabilities. Therefore, any of the assigned timeslots may contain a separate radio block received over a duration of 20 msecs. The exact time that a radio block can start, that is, the location of the GSM frame that contains the first burst, is given by frame timing rules in the GSM standard.

GSM R7 also may include using an RTTI transmission format, where a pair of timeslots in a first GSM frame contains a first set of two (2) bursts, and second GSM frame contains a second set of two (2) bursts. The first and second frames of the four (4) total bursts make up the radio block. A transmission using RTTI therefore only takes 2 frames times 4.615 msecs, or roughly 10 msecs. RTTI operation is possible with both EGPRS and EGPRS-2 transmission formats. Similar to the BTTI mode of operation, multiple timeslots can be used with the RTTI mode of operation in a multislot reception and/or transmission configuration. Multiple sets of pair-wise allocated timeslots per frame contain bursts corresponding to RTTI radio blocks, each of which is transmitted in 10 msecs, the duration of two (2) GSM frames.

Multiple WTRUs may be sharing the same uplink (UL) and/or downlink (DL) resources. This may be accomplished by multiplexing the DL signals for the multiple WTRUs on the single physical resource, such as the Packet Data Channel (PDCH), for example.

A WTRU, such as a legacy WTRU, for example, can operate in BTTI-mode only. Alternatively, a WTRU can support RTTI-mode only. The GSM R7 standard includes a number of possibilities to assign WTRUs to timeslots in conjunction with BTTI and/or RTTI operation. In a first mode of operation, one or more timeslots are exclusively assigned to WTRUs with TBFs operating in BTTI-mode only. In a second mode of operation, one or more timeslots are exclusively assigned to WTRUs with TBFs operating in RTTI mode only. In a third mode of operation, one or more timeslots are assigned to WTRUs with one or more TBFs operating in BTTI mode simultaneously with one or more TBFs on the same timeslots operating in RTTI mode. These modes of operation may apply to all transmission schemes in the GSM system, e.g. EGPRS and EGPRS-2.

Constraints arise when WTRUs that are not RTTI compatible are multiplexed with WTRUs that are using RTTI. For example, transmissions to WTRUs that are assigned one or more TBFs using the RTTI format may be multiplexed onto shared timeslots with BTTI WTRU. The RTTI WTRUs must respect the legacy uplink state flag (USF) format and corresponding stealing flag (SF) settings of legacy BTTI WTRUs.

Also, legacy burst processing techniques may create a problem. A legacy BTTI WTRU may determine the modulation type of a received radio block by processing the radio block with appropriate phase rotations and burst detection techniques before attempting to process the SF, the USF, and the radio link control/medium access control (RLC/MAC) header information. Therefore, two consecutive RTTI radio blocks that may be sent to a legacy (E)GPRS WTRU during one legacy BTTI time interval should include the same modulation type in each radio block, in order not to impact USF decoding ability by the legacy BTTI WTRU. For example, both radio blocks may be GMSK, or both radio blocks may be 8PSK, but they should not be mixed.

Also, a BTTI WTRU may assume that any BTTI radio block on its assigned timeslots and transmitted over a period of four (4) consecutive GSM frames can only start at certain, well-defined instances, for example, in frame (N), (N+4) or (N+8), where N is an integer value. Therefore, if an RTTI block is transmitted to an RTTI WTRU in frames N and (N+1), for example, a BTTI radio block to a second WTRU can not be transmitted starting in frame (N+2).

A PDCH may carry radio link control (RLC)/medium access control (MAC) data and control blocks. Depending on the capabilities of the WTRU and/or the network, RLC/MAC data blocks can use either GPRS CS-1 to CS-4 or EGPRS MCS-1 to MCS-9 MCSs with a legacy GPRS mode of operation. The choice of MCS for initial transmission or retransmission may be subject to link adaptation, power-control and similar procedures in GSM networks. However, due to the required robustness for control messages, RLC/MAC control blocks may be sent using an MCS with a low modulation order, e.g. GMSK, and a high amount of channel coding. For example, the robust CS-1 MCS is used for RLC/MAC control blocks with legacy GPRS and EGPRS mode of operation. A BTTI WTRU operating in compliance with GSM Release 7 may receive RLC/MAC control blocks sent in BTTI mode using CS-1, even when multiplexed with RTTI WTRUs onto the same timeslots.

When an RLC/MAC control block needs to be sent to an RTTI WTRU, Modulation and Coding Scheme 1 (MCS-1) may be used for control blocks when operating in the GSM Release 7 Reduced Transmission Time Interval (RTTI) Mode. An MCS-1 based mode of transmission for RLC/MAC control blocks in RTTI may be implemented by changing the header format for MCS-1 radio blocks while indicating the coding and puncturing scheme (CPS) for the payload. The CPS allows the WTRU to differentiate between an RLC/MAC Data Block using MCS-1 from an RLC message carrying an RLC/MAC control block using MCS-1. MCS-1 in the context of carrying control-type messages may also be known as MCS-0, and may acquire other designations in the future.

Figure 1:
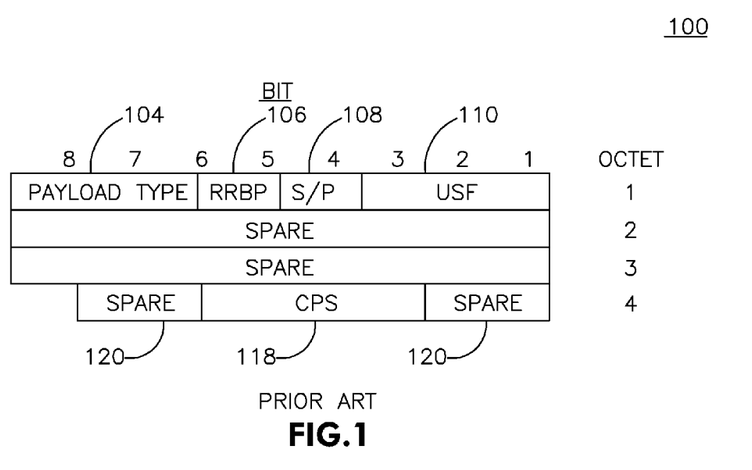
FIG. 1 shows a layout of the RLC/MAC header for MCS-1 downlink signaling in accordance with the prior art.

FIG. 1 shows a layout of the RLC/MAC header 100 for MCS-1 downlink signaling in accordance with the prior art. Octet 1 (102) includes a payload type field 104, a relative reserved block period (RRBP) field 106, a supplementary/polling (S/P) field 108 and a uplink state flag (USF) field 110. Octet 2 (112) and Octet 3 (114) are unused. Octet 4 (116) includes spare fields 120 and a CPS field 118.

Two octets, octet 2 (112) and octet 3 (114) may be left empty in a modified MCS-1 header 100 that is used for RLC/MAC control block transmissions in RTTI mode. In order to identify that the MCS-1 modulated radio block contains an RLC/MAC control block instead of an RLC/MAC data block, the CPS field 118 is used to differentiate between these two formats. Therefore the CPS field 118 of the MCS-1 header 100 is in the same bit positions in a modified MCS-1 block carrying an RLC/MAC control message as in a regular MCS-1 block carrying RLC data. Due to the requirement that the CPS field 118 not be moved, along with other requirement for other fields, there are two empty octets 112,114 in the header.

Because the MCS-1 header 100 is encoded and mapped separately from the data, and, if applicable, the piggy-backed ACKINACK (PAN) portions of the four (4) bursts making up the radio block, transmitting spare octets in the header to ensure proper reading of the CPS field 118 may result in a waste of transmission bandwidth and reduced decoding performance for the MCS-1 transmission format. It would therefore be desirable to have a method and apparatus for MCS-1 transmissions that can carry both RLC/MAC data and control blocks in RTTI mode of operation, while allowing for efficient header coding formats and robust signaling of RTTI radio blocks.

SUMMARY

Disclosed herein is a method and apparatus for signaling in a wireless communication system. A base station system (BSS) can transmit and a WTRU can receive a downlink RLC/MAC control block with a header. The header may include a cyclic redundancy check (CRC) of the RLC/MAC payload. The header may also include a CPS extension, a block sequence number (BSN) and a radio transaction identifier (RTI).

BRIEF DESCRIPTION OF THE DRAWINGS

A more detailed understanding may be had from the following description, given by way of example and to be understood in conjunction with the accompanying drawings wherein.

DETAILED DESCRIPTION

Figure 2:
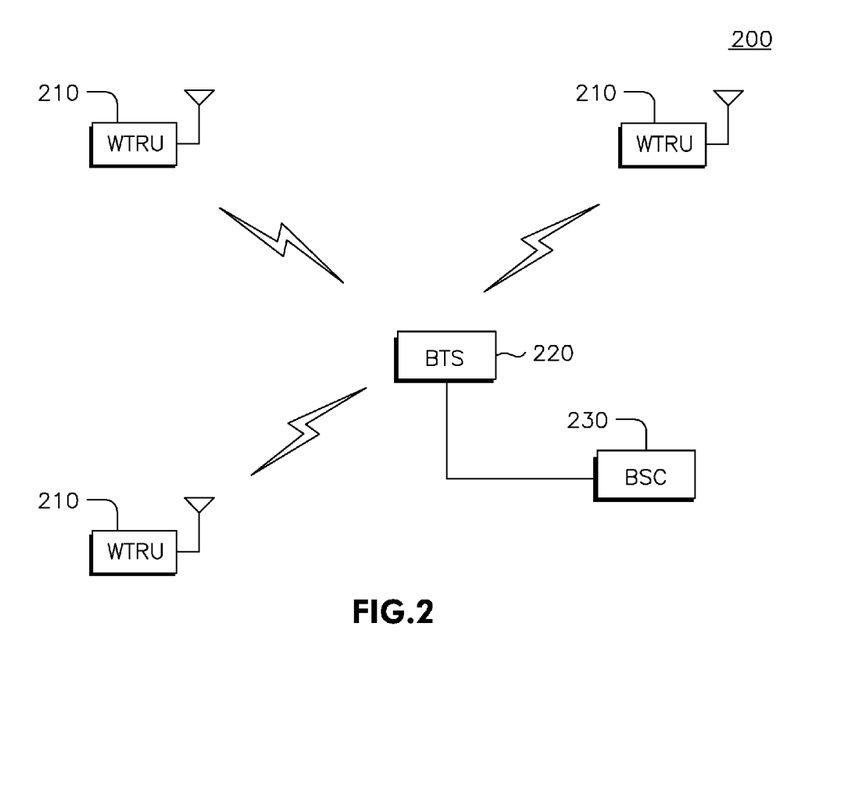
FIG. 2 shows an example wireless communication system including a plurality of wireless transmit/receive units (WTRUs), a base transceiver station (BTS) and a base station controller (BSC)

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment FIG. 2 shows a wireless communication system 200 including a plurality of WTRUs 210, a base transceiver station (BTS) 220, and a base station controller (BSC) 230. As shown in FIG. 2, the WTRUs 210 are in communication with the BTS 220, which is in communication with the BSC 230. Although three WTRUs 210, one BTS 220 and one BSC 230 are shown in FIG. 2, it should be noted that any combination of wireless and wired devices may be included in the wireless communication system 200.

Figure 3:
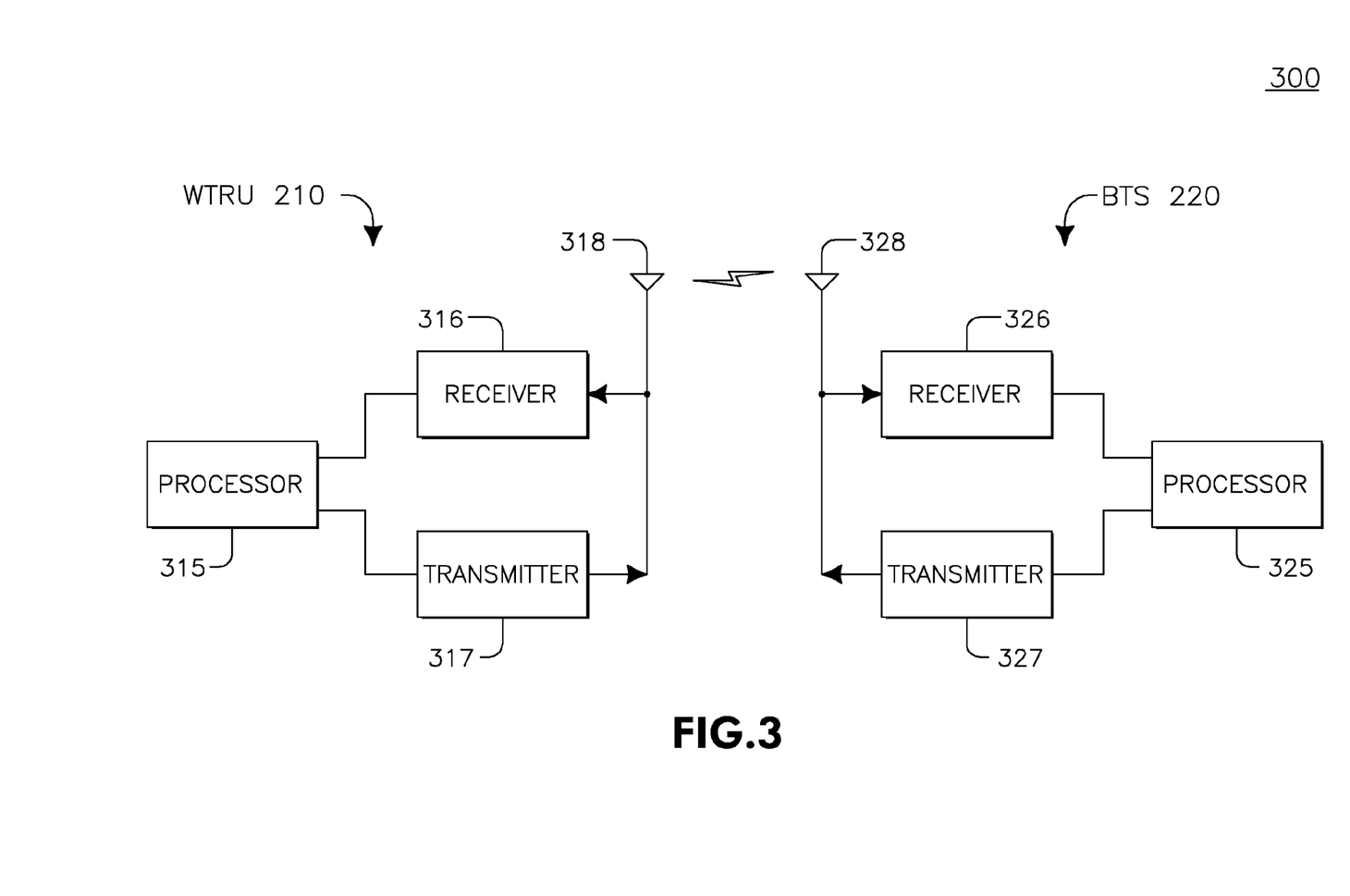
FIG. 3 is a functional block diagram of a WTRU and the base station of FIG. 2.

FIG. 3 is a functional block diagram 300 of a WTRU 210 and the BTS 220 of the wireless communication system 200 of FIG. 2. As shown in FIG. 3, the WTRU 210 is in communication with the BTS 220. In addition to the components that may be found in a typical WTRU, the WTRU 210 includes a processor 315, a receiver 316, a transmitter 317, and an antenna 318. The processor 315 may be configured to code and decode data and control blocks according to various MCSs, including, but not limited to, CS-1, MCS-0 and MCS-1. The receiver 316 and the transmitter 317 are in communication with the processor 315, and are configured to transmit and receive coded radio blocks, respectively. The antenna 318 is in communication with both the receiver 316 and the transmitter 317 to facilitate the transmission and reception of wireless data.

In addition to the components that may be found in a typical base transceiver system, BTS 220 includes a processor 325, a receiver 326, a transmitter 327, and an antenna 328. The processor 325 may be configured to code and decode data and control blocks according to various MCSs, including, but not limited to, CS-1, MCS-0 and MCS-1. The receiver 326 and the transmitter 327 are in communication with the processor 325. The receiver 326 and the transmitter 327 may be configured to transmit and receive coded radio blocks, respectively. The antenna 328 is in communication with both the receiver 326 and the transmitter 327 to facilitate the transmission and reception of wireless data.

The BSC 230 may be configured to process the RLC/MAC header and transmit the completed header to the BTS 220. Alternatively, the BTS 220 may be configured to complete the header. The BSC 230 may transmit a header comprising all zeros (0s) to the BTS 220, where the BTS 220 completes the header processing.

Figure 4A:
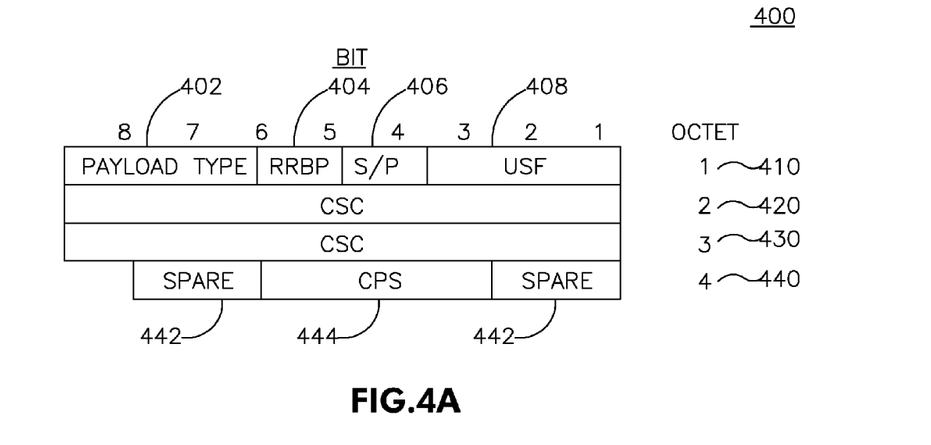
FIG. 4a shows a layout of the RLC/MAC header for MCS-1 downlink signaling in accordance with one embodiment.

FIG. 4a shows a layout of the RLC/MAC header 400 for MCS-1 downlink signaling in accordance with one embodiment. Octet 2 (420) and octet 3 (430) include a cyclic redundancy check (CRC) of the payload. The payload is a control signaling message that is encoded pursuant to MCS-1. By placing the CRC of the payload in the header, the header may be used to support the payload. By using both octet 2 (420) and octet 3 (430), a 16-bit CRC can be used. This allows for a reduction of information bits in the payload which may result in a lower forward error correction (FEC) code rate, less puncturing, and therefore a more reliable payload transmission.

Figure 4B:
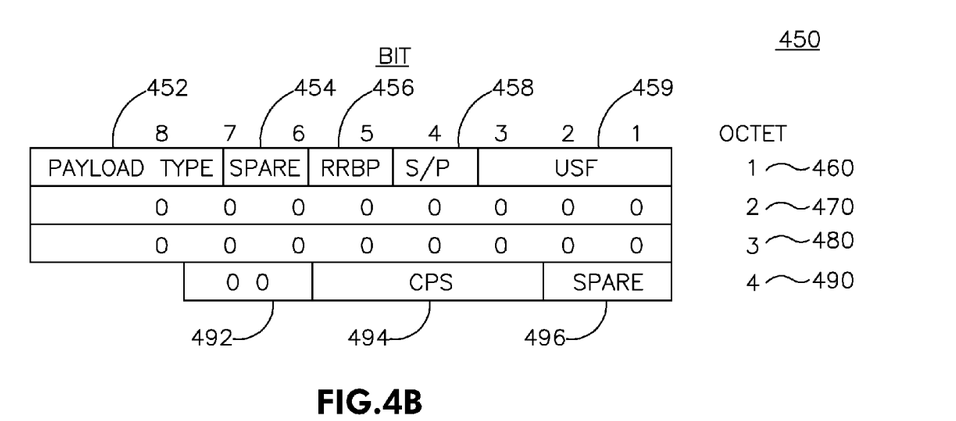
FIG. 4b shows a layout of the RLC/MAC header for MCS-1 downlink signaling in accordance with another embodiment.

FIG. 4b shows a layout of the RLC/MAC header 450 for MCS-1 downlink signaling in accordance with another embodiment. Octet 2 (470) and octet 3 (480) include 16 bits of an 18 bit CRC of the payload. The eight (8) bits from octet 2 (470), the eight (8) bits from octet 3 (480), and two spare bits 492 from octet 4 (490) may be combined to create the required 18 bits. The '0's may be replaced by the 18 bit CRC during the channel coding.

Optionally, a 12-bit, 14-bit, or other sized CRC may be used. The bits not used for the CRC may be used for other purposes, or they may be left spare. Referring back to FIG. 4a, as there are also spare bits 442 in octet 4 (440), the CRC may be created from the spare bits 442 of octet 4 (440) combined with any number of spare bits from octet 3 (430) and octet 2 (420).

Optionally, the CRC may be split between the header and payload. Some of the spare bits in the header may be used for CRC, while other are left unused, while some of the payload bits carry the part of the CRC.

By inserting the payload CRC into the header, the payload can be channel-coded in a more robust manner. Therefore the transmission of the payload may become more reliable.

Optionally, any 16 bits from the payload may be placed in the spare bits in the header. Any arbitrary 16 information bits may be placed in the header, rather than the CRC.

The header 400 of FIG. 4a also includes a payload type field 402, an RRBP field 404, an S/P field 406 and a USF field 408. These fields are located in octet 1 (410). Octet 4 (440) includes 3 spare bits 442 and a CPS field 444.

The header 450 of FIG. 4b also includes a payload type field 452, an RRBP field 454, an S/P field 456 and a USF field 458. These fields are located in octet 1 (460). Octet 4 (490) includes 3 spare bits 492 and a CPS field 494.

Figure 5:
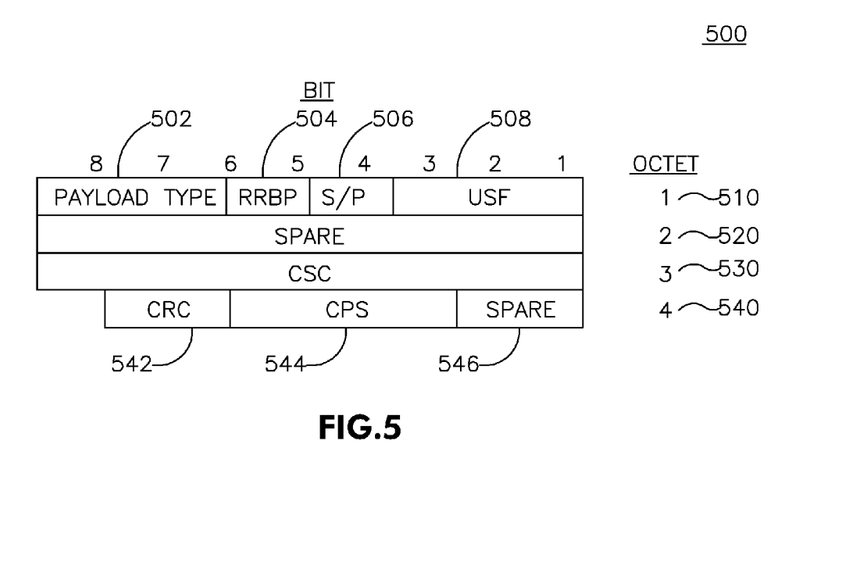
FIG. 5 shows a layout of an RLC/MAC header for MCS-1 downlink signaling in accordance with yet another embodiment.

FIG. 5 shows a layout of an RLC/MAC header 500 for MCS-1 downlink signaling in accordance with yet another embodiment. FIG. 5 shows octet 1 (510) that includes a payload type field 502, an RRBP field 504, an S/P field 506 and an USF field 508. Octet 2 (520) is unused. Octet 3 (530) includes an 8-bit CRC. Octet 4 (540) includes an additional 2 bits of the CRC (542), the 3-bit CPS field 544 and 2 spare bits 546.

Figure 6:
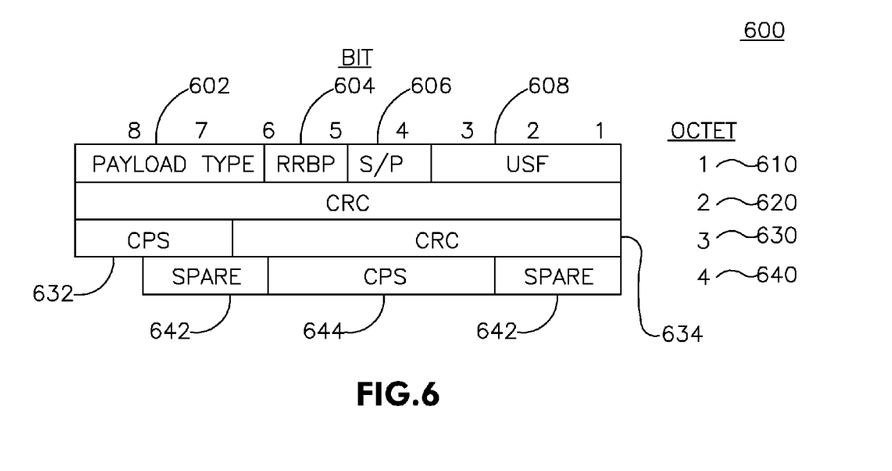
FIG. 6 shows a layout of an RLC/MAC header for MCS-1 downlink signaling in accordance with an alternative embodiment.

FIG. 6 shows a layout of an RLC/MAC header 600 for MCS-1 downlink signaling in accordance with an alternative embodiment. FIG. 6 shows octet 1 (610) that includes a payload type field 602, an RRBP field 604, an S/P field 606 and an USF field 608. Octet 2 (620) is used for 8 bits of CRC. Octet 3 (630) includes 6 bits of CRC 632 and a 2 bit CPS extension 644. Octet 4 (640) includes the 3-bit CPS field 644 and 2 spare bit fields 642.

Figure 7:
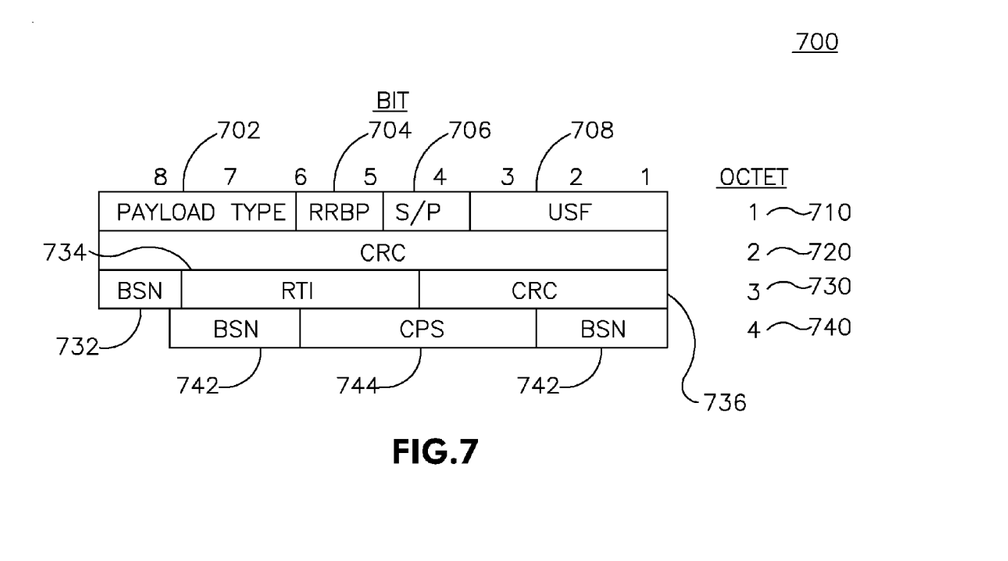
FIG. 7 shows a layout of an RLC/MAC header for MCS-1 downlink signaling in accordance with another alternative embodiment.

FIG. 7 shows a layout of an RLC/MAC header 700 for MCS-1 downlink signaling in accordance with another alternative embodiment. FIG. 7 shows octet 1 (710) that includes a payload type field 702, an RRBP field 704, an S/P field 706 and an USF field 708. Octet 2 (720) is used for 8 bits of CRC. Octet 3 (730) includes 4 bits of CRC 736, a 3 bit radio transaction identifier (RTI) 734 and a 2 bit block sequence number (BSN) field 732. Octet 4 (740) includes the 3-bit CPS field 744 and 2 fields for BSN 742. This increases the information carrying capacity of the RLC/MAC packet, thereby improving the efficiency of the radio resources within the system.

Figure 8:
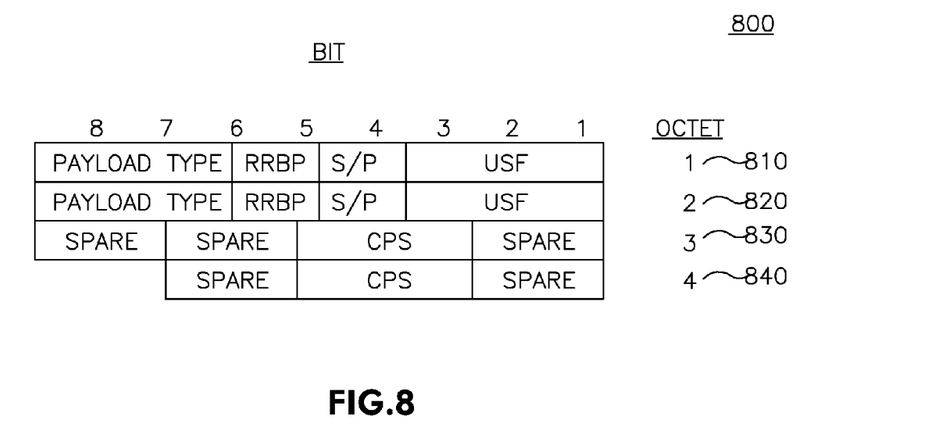
FIG. 8 shows a layout of an RLC/MAC header for MCS-1 downlink signaling in accordance with another alternative embodiment.

FIG. 8 shows a layout of an RLC/MAC header 800 for MCS-1 downlink signaling in accordance with another alternative embodiment. The contents of octets 1 (810) are duplicated in octet 2 (820). The contents of octet 4 (840) are duplicated in octet 3 (830). This may reduce error in transmission of the header, due to the increased redundancy of the information carrying bits.

In another alternative embodiment, the spare bits may be used to carry an auxiliary USF to support the option of multiplexing with legacy, or basic transmission time interval (BTTI), WTRUs. This may allow a WTRU to read an indication of USF signaling in a 10 ms timeslot.

In another alternative embodiment, octets 2 and 3 may be used to carry information regarding dual carriers in the downlink. EGPRS2 allows for the transmission of information in the downlink on two separate carriers to a single WTRU, thereby potentially doubling the date rate. The spare octets may be filled with information indicating the presence of an additional carrier as well as the details of the data transmitted, such as sequence numbers and the like.

All of the embodiments herein may be coded with an MCS-1 based modulation and coding scheme for data-type transmissions. Alternatively, an MCS-0 modulation and coding scheme may be used when control messages for (E)GPRS Release 7 are being transmitted.

All of the embodiments herein may be coded using a BTTI transmission format, in particular when MCS-0 for control messages is employed either in conjunction with CS-1 or separately to carry RLC/MAC control blocks.

All of the embodiments herein may be used in a downlink (DL) direction or in an uplink (UL) direction.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital video disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, base station controller (BSC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit receive unit (WTRU), the method comprising:
    receiving, at the WTRU, a radio link control (RLC)/medium access control (MAC) control block comprising a header and a control message payload, wherein the header is coded for reduced transmission time interval (RTTI) operation and comprises an 18-bit cyclic redundancy check (CRC) based only on the control message payload; and
    decoding, at the WTRU, the RLC/MAC control block based on the 18-bit CRC.

2. The method as in claim 1, wherein the header includes four octets, and wherein eight bits of the 18-bit CRC are located in a second octet of the header, eight bits of the 18-bit CRC are located in a third octet of the header, and two bits of the 18-bit CRC are located in a fourth octet of the header.

3. The method as in claim 1, wherein the header is coded according to a Modulation and Coding Scheme 0(MCS-0).

4. The method as in claim 1, wherein the RLC/MAC header includes Relative Reserved Block Period (RRBP) information, Supplementary/Polling (S/P) information, Coding and Puncturing Scheme (CPS) information, and Uplink State Flag (USF) information.

5. The method as in claim 1, wherein the control block includes Radio Transaction Identifier (RTI) and Block Sequence Number (BSN) information.

6. A method for use in a base station, the method comprising:
    generating, in the base station, a radio link control (RLC)/medium access control (MAC) control block comprising a header and a control message payload, wherein the header is coded for reduced transmission time interval (RRTI) operation and comprises an 18-bit error detection cyclic redundancy check (CRC) based only on the control message payload; and
    transmitting, from the base station, the RLC/MAC control block to a wireless transmit/receive unit (WTRU).

7. The method as in claim 6, wherein the header includes four octets, and wherein eight bits of the 18-bit CRC are located in a second octet of the header, eight bits of the 18-bit CRC are located in a third octet of the header, and two bits of the 18-bit CRC are located in a fourth octet of the header.

8. The method as in claim 6, wherein the header is coded according to a Modulation and Coding Scheme 0 (MCS-0).

9. The method as in claim 6, wherein the RLC/MAC header includes Relative Reserved Block Period (RRBP) information, Supplementary/Polling (S/P) information, Coding and Puncturing Scheme (CPS) information, and Uplink State Flag (USF) information.

10. The method as in claim 6, wherein the control block includes Radio Transaction Identifier (RTI) and Block Sequence Number (BSN) information.

11. A wireless transmit receive unit (WTRU), the WTRU comprising:
    a receiver configured to receive a radio link control (RLC)/medium access control (MAC) control block comprising a header and a control message payload, wherein the header is coded for reduced transmission time interval (RTTI) operation and comprises an 18-bit error detection cyclic redundancy check (CRC) based only on the control message payload; and
    a processor configured to decode the RLC/MAC control block based on the 18-bit CRC.

12. The WTRU as in claim 11, wherein the header includes four octets, and wherein eight bits of the 18-bit CRC are located in a second octet of the header, eight bits of the 18-bit CRC are located in a third octet of the header, and two bits of the 18-bit CRC are located in a fourth octet of the header.

13. The WTRU as in claim 11, wherein the header is coded according to Modulation and Coding Scheme 0 (MCS-0).

14. The WTRU as in claim 11, wherein the header includes Relative Reserved Block Period (RRBP) information, Supplementary/Polling (S/P) information, Coding and Puncturing Scheme (CPS) information, and Uplink State Flag (USF) information.

15. The WTRU as in claim 11, wherein the control block includes Radio Transaction Identifier (RTI) and Block Sequence Number (BSN) information.

16. A base station comprising:
    a processor configured to generate a radio link control (RLC)/medium access control (MAC) control block comprising a header and a control message payload, wherein the header is coded for reduced transmission time interval (RRTI) operation and comprises an 18-bit error detection cyclic redundancy check (CRC) based only on the control message payload; and
    a transmitter configured to transmit the RLC/MAC control block to a wireless transmit/receive unit (WTRU).

17. The base station of claim 16, wherein the header includes four octets, eight bits of the 18-bit CRC are located in a second octet of the header, eight bits of the 18-bit CRC are located in a third octet of the header, and two bits of the 18-bit CRC are located in a fourth octet of the header.

18. The base station of claim 16, wherein the header is coded according to a Modulation and Coding Scheme 0 (MCS-0).

19. The base station of claim 16, wherein the header includes Relative Reserved Block Period (RRBP) information, Supplementary/Polling (S/P) information, Coding and Puncturing Scheme (CPS) information, and Uplink State Flag (USF) information.

20. The base station of claim 16, wherein the RLC/MAC control block includes Radio Transaction Identifier (RTI) and Block Sequence Number (BSN) information.

* * * * *